Aug. 11, 1959 J. G. TRYON 2,899,133

BINARY ADDER-SUBTRACTER

Filed Dec. 2, 1954 3 Sheets-Sheet 1

INVENTOR
J. G. TRYON
BY H. O. Wright
ATTORNEY

FIG. 2

ADDITION

| A. HALF-ADDER | | | | B. HALF-ADDER-SUBTRACTER | | | | C. NEW CARRY |
|---|---|---|---|---|---|---|---|---|
| INPUTS | | OUTPUTS | | INPUTS | | OUTPUTS | | |
| ADDEND | PREVIOUS CARRY | 1 ST CARRY | INT. SUM | INT. SUM | AUGEND | 2 ND CARRY | SUM | |
| 0 | 0 | 0 | 0 | 0 | 0 | 0 | 0 | 0 |
| 0 | 1 | 0 | 1 | 1 | 1 | 1 | 0 | 1 |
| 1 | 0 | 0 | 1 | 1 | 0 | 0 | 1 | 0 |
| 1 | 1 | 1 | 0 | 0 | 1 | 0 | 1 | 1 |

FIG. 3

SUBTRACTION

| D. HALF-ADDER | | | | E. HALF-ADDER-SUBTRACTER | | | | F. NEW CARRY |
|---|---|---|---|---|---|---|---|---|
| INPUTS | | OUTPUTS | | INPUTS | | OUTPUTS | | |
| SUBTRAHEND | PREVIOUS CARRY | 1 ST CARRY | INT. SUM | INT. SUM | MINUEND | 2 ND CARRY | DIFF. | |
| 0 | 0 | 0 | 0 | 0 | 0 | 0 | 0 | 0 |
| 0 | 1 | 0 | 1 | 1 | 1 | 0 | 0 | 0 |
| 1 | 0 | 0 | 1 | 1 | 0 | 1 | 1 | 1 |
| 1 | 1 | 1 | 0 | 0 | 1 | 0 | 1 | 1 |

INVENTOR
J. G. TRYON
BY H. O. Wright
ATTORNEY

Aug. 11, 1959 J. G. TRYON 2,899,133

BINARY ADDER-SUBTRACTER

Filed Dec. 2, 1954 3 Sheets-Sheet 3

INVENTOR
J. G. TRYON
BY H. O. Wright
ATTORNEY

United States Patent Office 2,899,133

Patented Aug. 11, 1959

2,899,133

BINARY ADDER-SUBTRACTER

John G. Tryon, Chatham, N.J., assignor to Bell Telephone Laboratories, Incorporated, New York, N.Y., a corporation of New York Application December 2, 1954, Serial No. 472,688

1 Claim. (Cl. 235—165)

Figure 1:
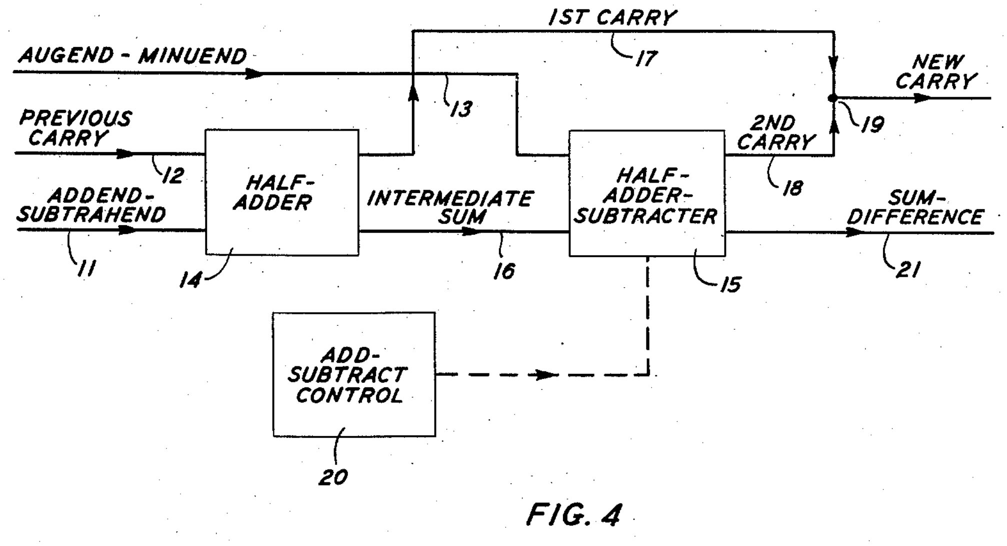

This application relates to binary computer circuits which may be used for both addition and subtraction.

In binary computing apparatus, two half-adder-subtracters are frequently used when two binary numbers are to be added or subtracted. The half-adder-subtracters are capable of being changed over from half-adders to half-subtracters and back again by separate switching circuits. When addition is wanted, both half-units, or half-adder-subtracters, are made half-adders. In the first half-adder, corresponding digits of two binary numbers are normally added together; and the carry from the addition of the preceding (less significant) pair of digits is added to the intermediate sum in the second half-adder. Binary subtraction is normally performed in a similar manner with both of the two half-adder-subtracters being changed into half-subtracters.

The principal object of the present invention is the simplification of binary computer circuits which may be used for both addition and subtraction.

In accordance with the present invention, a circuit capable of the addition or subtraction of two binary digits and a carry requires only one half-adder and one half-adder-subtracter. In operation, the half-adder remains the same for both addition and subtraction. The half-adder-subtracter is made a half-adder for addition and a half-subtracter for subtraction, the change being made by a separate switching operation. The invention involves the rearrangement of the input and output circuits of the two half-units making up the computer circuit. The result of the rearrangement is that the first half-unit is only required to add, never to subtract, and thus becomes a simple half-adder. In accordance with the present invention, corresponding digits of the two binary numbers are applied to the first half-unit (the half-adder) and to the second half-unit (the half-adder-subtracter), respectively; and the carry (or borrow) from the preceding (less significant) pair of digits is applied to the first half-adder. This is in contrast with the prior art arrangement mentioned above, in which digits of the two binary numbers are combined in a first half-adder-subtracter, and the carry is applied to a second half-adder-subtracter.

Other objects and various advantages and features of the invention will become apparent by reference to the following detailed description taken in connection with the accompanying drawings and from the appended claims.

Figure 4:
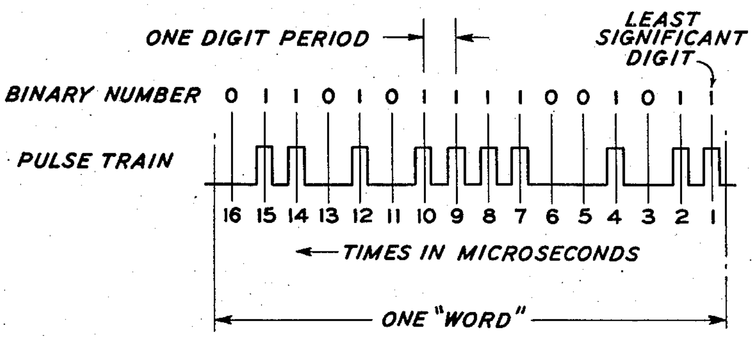
Figure 5:
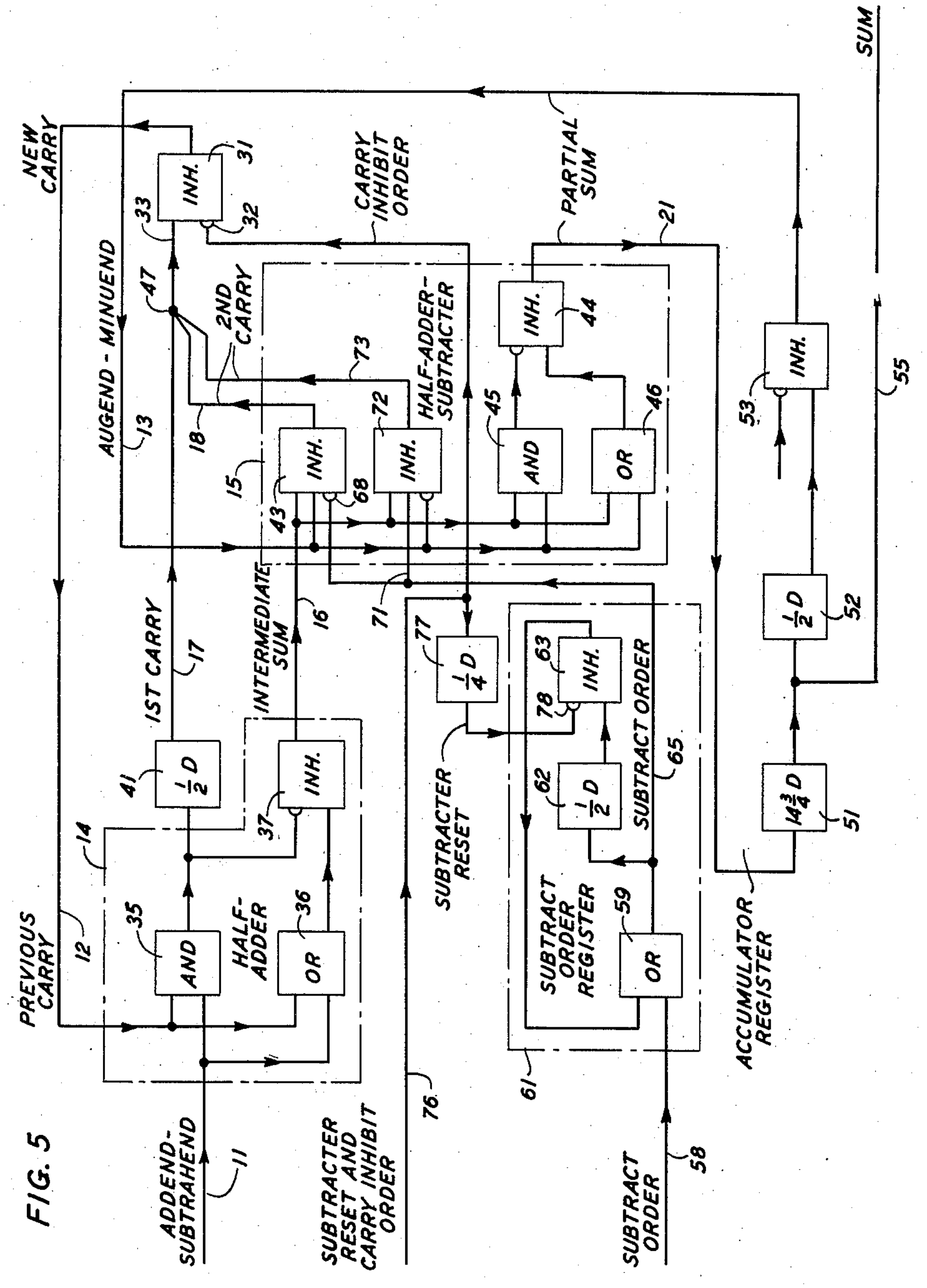

In the drawings:

Fig. 1 is a schematic block diagram of the addition and subtraction circuits in accordance with the invention;

Fig. 2, comprising portions A, B, and C, taken together, is a table indicating the pulse outputs at various points in the circuit of Fig. 1 when this circuit is employed for addition;

Fig. 3, comprising portions D, E, and F, is a similar table for subtraction;

Fig. 4 illustrates the representation of a binary number by a series of pulses; and Fig. 5 is a schematic block diagram of an adder-subtracter circuit illustrating the principles of the invention presented in terms of "logical" circuit components.

In the consideration of a binary computing circuit which is capable of both adding and subtracting, a good starting point is an example of binary addition and of binary subtraction:

| | | |
|---|---|---|
| Addition: | 0.0101 | Augend |
| | +0.0111 | Addend |
| | 0.1100 | Sum |
| Subtraction: | 0.1101 | Minuend |
| | −0.0111 | Subtrahend |
| | 0.0110 | Difference |

The foregoing examples illustrate the fact that the operations of binary addition and subtraction are much like their decimal counterparts, with the expected changes resulting from the change from a base of 10 to a base of 2. The addition of the least significant digit of the addend to the least significant digit of the augend only involves the addition of the two digits. In general, however, the possibility of a carry must be considered, and therefore allowance must be made to accommodate three digits for each digit position of the addend and augend. Although it has been proposed to employ circuits which add these three digits together simultaneously, it is frequently advantageous to break the operation down into two steps.

Fig. 1 shows, by way of example, and for purposes of illustration, in block diagram form, how these two steps are instrumented in accordance with the present invention. In the process of addition, the half-adder 14 adds together the addend and previous carry digits, which are applied to the input leads 11 and 12, respectively. This addition is performed in accordance with table A of Fig. 2, to form the intermediate sum and first carry digits on leads 16 and 17, respectively. (Table A of Fig. 2 is the definitive specification of a half-adder.) The half-adder-subtracter 15 (which is operating as a half-adder) then adds together the intermediate sum and augend digits (see lead 13) to yield the sum and second carry digits appearing on leads 21 and 18, respectively. In this operation, the half-unit 15 follows table B of Fig. 2, which is a substantial duplication of the half-adder table A of Fig. 2. The sum digit so produced is one of the required outputs of the circuit of Fig. 1. The other is the new carry, which is found by combining at terminal 19 the first and second carry signals.

The first and second carry output circuits may be combined directly without loss of information, because it turns out that when one carry is present, the other will not be present. The foregoing statement may be verified by a simple consideration of the carry possibilities when augend, addend and previous carry digits are one or zero.

During subtraction, the half-adder 14 adds the subtrahend (applied at lead 11) and previous carry digits, following table D of Fig. 3. This table is substantially the same as the half-adder table A of Fig. 2 with the first column entitled "subtrahend" instead of "addend." The results are the first carry output on lead 17 and the intermediate sum output on lead 16. The half-adder-subtracter 15, now operating as a half-substracter by virtue of a switching signal applied by the add-subtract control unit 20, then subtracts the intermediate sum digit from the minuend digit (applied at lead 13) to yield the difference and second carry digits at leads 21 and 18, respectively. It operates in accordance with table E of Fig. 3, which is the definitive statement of the properties of a half-subtracter. The first of the desired outputs from the circuit of Fig. 1, when it is operated as a subtracter, is the difference digit mentioned above; the other is the new carry formed by the combination of the first and second carries at terminal 19.

The digits which appear at input terminals 11 and 13 of the adder-subtracter are binary digits. Each digit may be represented by a signal. As illustrated by the examples of binary addition and subtraction, binary digits have either the value "1" or the valve "0." At the inputs 11 and 13 to the adder-subtracter of Fig. 1 (and at other points in the circuit), the presence of a signal indicates a "1" and the absence of a signal indicates a "0."

In the illustrative adder-subtracter circuits, which will be described in greater detail in connection with Fig. 5, each number is made up of sixteen digits in the binary code. The timing of the pulse trains is controlled by a standard pulse source or "clock" having a frequency of one megacycle per second. Each sixteen digit number, therefore, has sixteen "time slots" of one microsecond duration assigned to it. The numbers therefore appear as a series of pulses and spaces with the least significant digit appearing first.

Fig. 4 shows a sixteen digit binary number and the pulse train representing the number. A group of pulses representing one number, as shown in Fig. 4, is termed a "word" in the computer art. The sixteen positions at which pulses may occur are termed "digit time slots." The space between cormresponding points of pulses appearing in successive digit time slots is termed a "digit period." It may also be observed from Fig. 4 that the least significant digit occurs first in time. This is to facilitate arithmetic operations involving "carries," for example. Using the convention that the binary point always appears to the right of the most significant digit (digit number 16), the binary representation shown in Fig. 4 corresponds to the decimal number 0.8421325.

Fig. 1 shows a basic adder-subtracter circuit which may be used with either serial or parallel computing apparatus. When employed with a serial computer, the "new carry" output at terminal 19 of Fig. 1 is connected to the previous carry input lead 12. For proper operation of the logic circuits included in the half-adder 14, it is desirable that the pulses at the previous carry input 12 be synchronized with the arrival of the next addend digit at input lead 11. Accordingly, the total delay in the carry loop from input 12, through the half-adder 14 or the half-adder-subtracter 15, the carry circuit 19, and back to input lead 12 must be equal to one digit period. This will be more fully described in connection with the more detailed showing of Fig. 5.

Before proceeding to consider the details of Figs. 2 and 3, the arrangement of the input circuits of Fig. 1 deserves special consideration. When one adds two numbers, the first step is to add the least significant digit of the addend to the least significant digit of the augend. Therefore, when a computer is set up to perform the same function, the obvious arrangement of input circuits would be to add the addend and augend digits in the first half-unit 14 of Fig. 1. It has been discovered, in accordance with the invention, that by adding the carry to the addend or subtrahend in the first half-adder, and introducing the augend or minuend in the second half-unit, substantial economies may be secured. Specifically, instead of changing both half-units 14 and 15 from half-adders to half-subtracters, only the second half-unit need be changed to a half-subtracter when it is desired to perform subtraction operations instead of addition.

The rules for binary addition and subtraction in accordance with the circuit of Fig. 1 are as follows:

*Addition*

(1) Add the previous carry to the addend to obtain an intermediate sum and a first carry.

(2) Add the intermediate sum to the augend to obtain a final sum and a second carry.

(3) Take the sum of the first and second carries to obtain the new carry.

*Subtraction*

(1) Same as 1 above.

(2) Same as 2 above except that in the addition of the intermediate sum and the minuend, a second carry is generated by a process closely akin to addition, in which process a non-zero second carry digit is generated if, and only if, a one in the intermediate difference is added to a zero in the minuend.

(3) Same as 3 above.

The "definitive specifications" giving the required outputs for any specified combination of inputs for the circuit of Fig. 1 are shown in the tables of Figs. 2 and 3 for addition and subtraction, respectively. These "definitive specifications" are also termed "truth" tables. The greater portion of the "truth" tables for addition and subtraction are identical. The only differences appear in the "second carry" and "new carry" columns. To point up these differences, the digits in these columns are lettered in bold printing.

From the standpoint of using one computer to perform both addition and subtraction, the differences in the "new carry" columns are not critical. As indicated in Rule 3 for Addition and Rule 3 for Subtraction as set forth hereinabove, the new carry is the sum of the first and second carries for both addition and subtraction. Accordingly, no change in circuit is required to accommodate this difference in the "new carry" columns of the addition and subtraction "truth" tables.

Referring to the "second carry" columns of part B of Fig. 3 and part E of Fig. 4, it may be observed that only the third and fourth digits of these columns are different. Accordingly, switching means are provided in the half-adder-subtracter 15 of Fig. 1 to make this change in the second carry when shifting between addition and subtraction. The instrumentation of this shift will be discussed in detail in the course of the description of Fig. 5.

In Fig. 5, the present adder-subtracter circuit is described in somewhat greater detail. In this figure, the computer circuit is shown in terms of the "building blocks" or basic packaged circuits which may be employed in a digital computer. While the specific circuits which have been employed in these basic computer components have taken many different forms, one satisfactory set of packages is disclosed in the article entitled "Regenerative Amplifier for Digital Computer Applications" by J. H. Felker, which appeared at pages 1584 through 1956 of the November 1952 issue of the "Proceedings of the I. R. E." (volume 40, number 11). Four of the basic logical circuit elements which are disclosed on pages 1594 and 1595 of this article, and which are employed in the circuit diagram of Fig. 5, are as follows:

An Or unit, such as unit 36 in Fig. 5, yields a pulse output if a pulse is present at any of the inputs to the unit.

An And unit, such as unit 35 in Fig. 5, requires energization of all inputs to yield an output.

An "Inhibit" unit, such as unit 37 of Fig. 5, which is designated "Inh," is generally similar to an And unit, in that all of the normal inputs to the unit must be energized for it to yield an output pulse. However, a pulse on the inhibit input lead (marked with a semicircle at the point where the inhibit lead connects to the inhibit box) will override all other signals and block the output of the unit.

Delay units, such as unit 41 of Fig. 5, are indicated by boxes with the letter "D" therein, together with a number indicating the number of digit periods of delay included in the unit. The first four logic elements noted above also introduce a delay of one-quarter digit period or one-quarter microsecond.

As disclosed in the article by J. H. Felker cited above, the pulse regenerator is an important part of these logic circuits. The specific pulse regenerator circuit shown in the Felker article operates satisfactorily and may be used. Alternatively, an improved version of the regenerator, which appears in Patent No. 2,853,629 of J. H. Felker, which issued September 23, 1958, may be used.

The logical circuit diagram of Fig. 5 will now be considered in detail, and it will be shown how the operations designated by the "truth" tables of Figs. 2 and 3 are instrumented. The mechanization of the addition algorithm will be considered first in terms of the following four steps lettered (*a*) through (*d*), respectively:

(*a*) Start with the carry "0." This is accomplished through the use of the inhibit unit 31. The "Subtracter-Reset and Carry-Inhibit Order," lead 76, is applied to the inhibit terminal 32 of the inhibit unit 31 at the same time that first or second carries (resulting from the last addition operation of the previous set of numbers) is applied to the normal input lead 33 of the inhibit unit 31. This inhibiting operation prevents the transmission of an undesired carry to the input 12 of the half-adder 14 at the time it is processing the least significant digit of the addend of the next number.

(*b*) Add the previous carry and the least significant digit of the addend to form an intermediate sum digit and a first carry, and repeat cyclically for the successively more significant digits. This step is mechanized by the first half-adder 14, which includes the And unit 35, the Or unit 36, and the inhibit unit 37. The carry input circuit 12 is connected to both the And unit 35 and the Or unit 36. The addend input 11 is similarly connected to both of these input units 35 and 36. The output from the And unit 35 energizes the first carry circuit 17 as well as the inhibit terminal of the inhibit unit 37. The output of the Or unit 36 is connected to the normal input of the inhibit unit 37. The intermediate sum circuit 16 is connected to the output of the inhibit unit 37. The one-half digit delay unit 41 is placed in the first carry circuit to provide the necessary timing delay.

Comparing the first half-adder circuit with the "truth" table of part A of Fig. 3, it may be noted that a first carry is desired only if both the addend and the previous carry inputs are energized. The And unit 35 insures that these requirements are maintained. It is desired that there be an intermediate sum output when either but not both of the two inputs to the first half-adder are energized. If neither of the two inputs are energized the Or unit 36 has no output and thus, there can be no intermediate sum. If there are inputs on both circuits 11 and 12, there is a carry at the output of the And unit 35 which energizes the inhibit terminal of the inhibit unit 37. This blocks the output from Or unit 36 and prevents the passage of an intermediate sum digit. If only one of the two input circuits 11 and 12 are energized, however, the pulse passes through Or unit 36 and inhibit unit 37, and an intermediate sum digit appears on lead 16.

(*c*) Add the intermediate sum digit and the least significant digit of the augend to form the least significant digit of the sum and the second carry, and repeat cyclically for the successively more significant digits. The addition of the intermediate sum digits and the corresponding digits of the augend is performed in the half-adder-subtracter 15, which is made up of the inhibit units 43, 44, and 72, the And unit 45, and the Or unit 46. The sum which appears at output circuit 21 is formed in the And unit 45, the Or unit 46, and the inhibit unit 44 in the same manner that the intermediate sum is formed in the And unit 35, the Or unit 36, and the inhibit unit 37 of the first half-adder 14. The second carry for addition appears on lead 18 and is formed by the two normal inputs to the inhibit unit 43 from the intermediate sum and the augend, respectively. The inhibit terminal 68 of the inhibit unit 43 is, of course, not energized during addition; and thus there will be an addition second carry developed on lead 18 only when both normal inputs to the inhibit unit 43 are energized, as required by the "truth" table of part B of Fig. 2.

(*d*) Add thte first carry of step (*b*) and the second carry of step (*c*) to obtain the new carry, and repeat cyclically. This operation may be performed merely by combining outputs from the first carry circuit 17 and the second carry circuit 18, because if a non-zero first carry exists, a non-zero second carry cannot exist. Inasmuch as the outputs from delay unit 41, inhibit unit 43, and inhibit unit 72 are all buffered, their outputs may be combined at point 47 without an Or unit. As mentioned above in step (*a*), the inhibit unit 31 blocks the carry at the end of one number, and prevents its application to lead 12 to modify the first digit of the following number.

The successive digits of the sum which appear at circuit 21 at the output from the half-adder-subtracter 15 are passed through a delay loop including the delay units 51 and 52 and the inhibit unit 53. If it is desired to add additional numbers to this sum, the number is recirculated from the inhibit unit 53 back to the augend input 13, and added to additional numbers appearing at the addend input 11. It may be noted that the total loop delay of the partial sum through the half-adder-subtracter 15, the delay units 51 and 52, and the inhibit unit 53 is exactly sixteen digit periods, so that the new addend number will be synchronized with the partial sum appearing at the augend input lead 13. Immediately following the fourteen and three-quarter delay unit 51, the sum may be removed by way of lead 55 and routed to other portions of the computer, such as the storage unit, concurrently with the removal of the intermediate sum. The inhibit terminal of the inhibit unit 53 may be energized to clear the partial sum from the addition-subtraction computer circuit.

When the present computer circuits are employed for subtraction, a subtract order appears on lead 58. This passes through the Or unit 59 and energizes the subtract order register delay loop 61. This delay loop includes the one-half digit delay unit 62, and the inhibit unit 63, in addition to the Or unit 59. As mentioned hereinabove, the subtraction operation differs from the addition operation only in the nature of the second carry which is formed. The switching operation necessary to change the second carry is controlled by the output circuit 65 from the subtract order register delay loop 61. When there is no subtract order present on the circuit 65, the addition second carry appears at the output circuit 18 of the inhibit unit 43. The subtract order lead 65 is connected to the inhibit terminal 68 of the inhibit unit 43, and thus blocks this addition second carry during subtraction operations. The subtract order lead 65 is also connected to a normal input 71 of another inhibit unit 72. The output 73 from this inhibit unit 72 yields the second carry for subtraction operations. With the other normal input of the inhibit unit 72 connected to the intermediate sum circuit 16, and with the inhibit input terminal of inhibit unit 72 connected to the minuend input circuit 13, it may readily be seen that the second carry is formed as indicated by the "truth" table of part E of Fig. 3. This second carry for subtraction is combined with the first carry which appears on lead 17 at terminal 47 to yield the new carry for subtraction as indicated by part F of Fig. 3.

The steps necessary to change from subtraction to addition may be noted again. Specifically, a carry inhibit and subtracter reset order is applied to lead 76. The subtracter reset order is applied to the inhibit unit 63 in the subtract order delay loop 61 by way of the one-quarter digit delay unit 77. When this pulse is applied to the inhibit terminal 78 of the inhibit unit 63, the subtract order pulse which has been circulating through this delay loop 61 is blocked. Accordingly, the subtract order lead 65 is de-energized, and the second carry is taken from inhibit unit 43 instead of from inhibit unit 72. This changes the half-adder-subtracter 15 back to a half-adder.

Although the present invention has been described in terms of serial binary computing circuits, it is also applicable to parallel binary circuits. For example, for use in a parallel adder-subtracter in which one half-adder and one half-adder-subtracter are employed for each digit of the numbers to be added or subtracted, the carry terminal of the half-adder-subtracter associated with each digit is connected to the input carry terminal of the half-adder associated with the next more significant digit.

In the present specification and claims, the terms "half-adder" and "half-adder-subtracter" are frequently employed. The term "half-adder-subtracter" requires a circuit which may be readily switched from addition to subtraction and vice versa. The term "half-adder," however, refers to a circuit which can only be used for addition, unless it is specifically indicated that it refers to a half-adder-subtracter arranged to perform addition.

It is to be understood that the above-described arrangements are illustrative of the application of the principles of the invention. Numerous other arrangements may be readily devised by those skilled in the art without departing from the spirit and scope of the invention.

What is claimed is:

In a serial binary computing circuit for adding or subtracting two binary numbers in which the digits of the numbers appear successively spaced by a predetermined time period, a half-adder having a carry input circuit and a first number input circuit, and an intermediate sum output circuit and a carry output circuit; a half-adder-subtracter having an input terminal connected to said intermediate sum output circuit, a second number input circuit, and three output circuits, the first of said half-adder-subtracter output circuits representing the carry for addition operations, the second of said output circuits representing the carry for subtraction operations, and the third being the sum output terminal; switching means included in said half-adder-subtracter for selecting one of said carry output circuits; a subtract order register including a delay loop having a delay equal to one of said time periods, and an inhibit unit in said delay loop, said switching means being connected to said subtract order register to select the carry for subtraction operations upon the receipt of pulses from said register; a resultant carry circuit connected to receive the carry from said half-adder and the selected carry from said half-adder-subtracter; means for coupling said resultant carry circuit back to the carry input circuit of said half-adder with an elapsed time in the loop through the computing apparatus and back to the carry input circuit equal to one of said predetermined time periods; another inhibiting circuit connected in the loop between the resultant carry circuit and the input to said half-adder; means for concurrently energizing circuits connected to the inhibiting inputs to the inhibit unit in said subtract order register and the inhibit unit in said loop to reset the subtract order register and to inhibit carries applied to said last-mentioned loop; and a delay line connecting said sum output terminal to said second number input circuit to form an accumulator, the total number of time periods of delay of said accumulator being equal to the number of digits in the binary numbers which are employed in said computer circuit.

References Cited in the file of this patent

UNITED STATES PATENTS

| | | |
|---|---|---|
| 2,686,632 | Wilkinson | Aug. 17, 1954 |
| 2,781,446 | Eckert et al. | Feb. 12, 1957 |
| 2,789,760 | Rey et al. | Apr. 23, 1957 |

FOREIGN PATENTS

| | | |
|---|---|---|
| 1,034,099 | France | Apr. 8, 1953 |
| 717,869 | Great Britain | Nov. 3, 1954 |

OTHER REFERENCES

"The Binac" (Auerbach et al.), Proceedings IRE, January 1952, page 19. (Figure 13 on page 22 further relied on.)

"Universal High-Speed Digital Computers: Serial Computing Circuits" (Williams et al.), Proceedings IRE, April 1952, pages 111, 112.